Sept. 29, 1936.  P. K. SAUNDERS  2,056,113

DIAPHRAGM VALVE

Filed March 27, 1936

Inventor
Philip K. Saunders
by Mawhinney & Mawhinney
Attorneys.

Patented Sept. 29, 1936

2,056,113

UNITED STATES PATENT OFFICE 2,056,113

DIAPHRAGM VALVE

Philip Keith Saunders, Wolverhampton, England, assignor to Saunders Inventions Limited, Wolverhampton, England Application March 27, 1936, Serial No. 71,217
In Great Britain August 23, 1934

3 Claims. (Cl. 251—24)

This invention relates to diaphragm valves of the kind where the diaphragm is positively opened on the appropriate operation of an actuator for the diaphragm.

My prior U. S. Patent No. 1,855,991 shows an actuator having a key-hole slot freely to receive a T-shaped stud, of the diaphragm, which is reinforced by piano-wire to prevent it from collapsing.

The main object of the present invention is to provide for the attachment of the diaphragm to the actuator in an improved manner, particularly for small diaphragm valves in which case the studs of the prior patent have to be of very small dimensions and are thus liable to give rise to difficulties.

A further object is to provide a resilient headed projection, which is integral with the diaphragm and is held in a compressed state in an undercut recess of the actuator.

In carrying out a further object of the invention, a resilient headed projection carried by the diaphragm is forced into an undercut recess, in the actuator, through a circular opening leading thereto. An alternative object is to provide for the headed projection to be slid laterally into said undercut recess.

According to a still further feature of the invention, the actuator includes separate portions jointly providing an undercut recess for the reception of a headed projection of the diaphragm, so that the head can thus be inserted without difficulty when larger than the recess. In a preferred arrangement, where the actuator is arranged to slide in a part of the valve body or of the cover therefor, the dimensions are such that the headed projection of the diaphragm will be held under compression when the parts are assembled. In these latter cases the separate portions of the actuator may be hinged together. As a matter of convenience, the hinging means may comprise a pin by which the compressor portion of the actuator is united to an actuating spindle therefor. Additional aligning means may also be provided for the actuator portions.

For a better understanding of the objects and advantages of the invention, the specific features of which are pointed out with particularity in the claims hereto appended, attention should be directed to the following description in which reference is made to the accompanying drawing.

In the accompanying drawing:—

Like numerals indicate like parts throughout the drawing.

Figure 2:
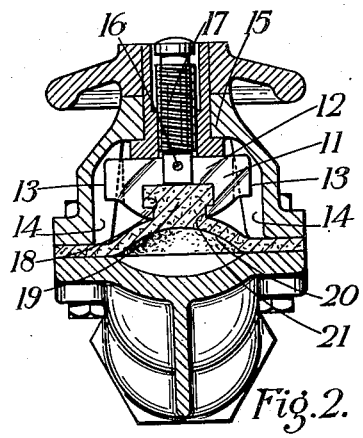
Figure 2 is a cross-section taken on the line II—II of Figure 1 but showing a modification.
Figure 3:
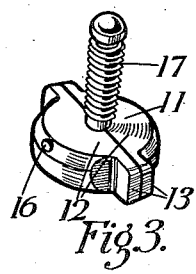
Figure 3 is a perspective view of the compressor and spindle of the actuator of Figure 2.
Figure 4:
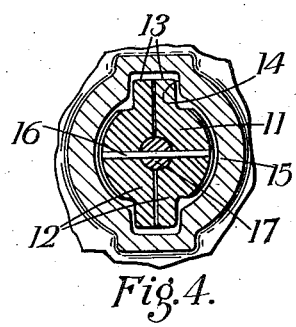
Figure 4 is a fragmentary sectional plan taken on the line IV—IV of Figure 1, but incorporating the modification of Figures 2 and 3.

In the construction illustrated by Figures 2 to 4, the compressor 11 of the actuator is split in halves 12, 12 on a plane in which its main axis lies, and parts 13, 13 of the peripheries of each half are shaped fairly accurately so as to co-act with a channel 14 formed in the cover 15 for the valve; such that when the actuator is assembled therein the parts will be held by the cover substantially against one another. For ensuring movement of the parts in unison use may be made of a hinge-pin 16 arranged transversely to the split, this same pin serving for joining the parts to the non-rotatable axially-movable actuating spindle 17. Beneath the pin the parts are formed with semi-cylindrical internal recesses which together provide an undercut cylindrical recess 18 of a size to receive a headed projection 19 formed on the diaphragm 20. This projection may be of relatively large dimensions and may be formed integrally with the diaphragm when this is of rubber, as is preferred, or arranged in other ways.

When a diaphragm has to be changed, the cover complete with the actuating mechanism is first removed and the actuator is then moved in the closing direction as far as possible, allowing the shaped peripheral portions 13 to leave the channels 14 in the cover. In these conditions the compressor portions 12 can be spread from one another sufficiently to allow of the withdrawal of the projection 19 from the undercut recess 18, and a new diaphragm can then be fitted. As soon as the actuator is drawn up into the bore of the cover the projection on the diaphragm is securely gripped, being then preferably held lightly under compression.

Figure 1:
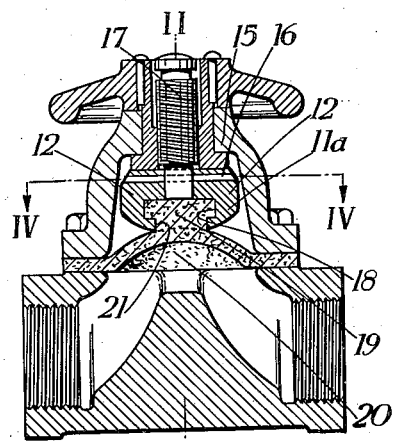
Figure 1 is a longitudinal section through one form of diaphragm valve adapted according to the invention.

In the modification of this arrangement, as shown by Figure 1, the compressor 11a is not split into halves, as is the compressor 11 above described; and as long as the head of the projection 19 is not too large, relatively to the opening 21 leading to the undercut recess 18, the head can be forced through the opening 21 into the undercut recess—assuming, of course, that it is of rubber or other resilient material. As is well known, wetting the head will assist this operation.

Figure 5:
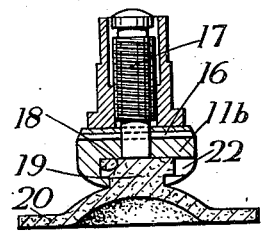
Figure 5 is a view similar to Figure 1, but with the valve cover and body omitted, of a modification.
Figure 6:
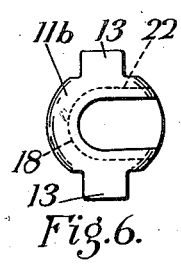
Figure 6 is an underside plan view of the compressor of Figure 5.
Figure 7:
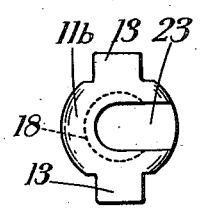
Figure 7 is a view similar to that of Figure 6 of a further modification.

In the modification of Figures 5 and 6 the undercut recess 18 of the compressor 11b has communicating with it a full-sized slot 22 along which the head 19 of the diaphragm 20 can be slid. In the modification of Figure 7 the equivalent lateral slot, 23, of the compressor 11c, is not full size, the head 19 being laterally compressed to be slid therealong into the undercut recess 18.

Thus, by means of the invention a very secure attachment can be provided in a simple manner between the actuator and the diaphragm of a small valve, whereby to ensure the positive opening of the valve. Owing to the relatively large size of the projection on the diaphragm the likelihood of it drawing away from the diaphragm or from the actuator is obviated.

What I claim as my invention and desire to secure by Letters Patent of the United States is:—

1. A diaphragm valve having a valve casing, an actuator for the diaphragm formed of separate portions jointly providing an undercut recess, a diaphragm having a headed projection which is received in said recess, said actuator having sliding contact with said valve casing so that said separate portions will be held adjacent one another to grip said projection in said recess.

2. In a diaphragm valve, an actuator for the diaphragm formed of separate portions jointly providing an undercut recess, a diaphragm having a headed projection which is received in said recess, a valve casing having oppositely-disposed parallel guiding channels, and parts on each of said separate portions adapted to slide in said channels and thus to maintain said separate portions adjacent one another.

3. For use in a diaphragm valve, an actuator comprising a compressor for the diaphragm which includes separate portions jointly providing an undercut recess, an actuating spindle, and means uniting said separate portions to one another and to said spindle, said means passing through said separate portions and said spindle.

PHILIP KEITH SAUNDERS.